(12) United States Patent
Unterbörsch et al.

(10) Patent No.: US 8,723,102 B2
(45) Date of Patent: May 13, 2014

(54) OPTICAL MODULE

(75) Inventors: Günter Unterbörsch, Berlin (DE);
Alexander Jacob, Berlin (DE); Andreas Beling, Charlottesville, VA (US)

(73) Assignee: u2t Photonics AG, Berlin (DE)

( * ) Notice: Subject to any disclaimer, the term of this patent is extended or adjusted under 35 U.S.C. 154(b) by 260 days.

(21) Appl. No.: 13/239,453

(22) Filed: Sep. 22, 2011

(65) Prior Publication Data
US 2012/0241598 A1 Sep. 27, 2012

(30) Foreign Application Priority Data

Sep. 27, 2010 (EP) ..................................... 10010760

(51) Int. Cl.
*G01J 1/04* (2006.01)
*H03F 3/08* (2006.01)

(52) U.S. Cl.
USPC ....................................... 250/227.11; 385/59

(58) Field of Classification Search
USPC .............................................. 385/49, 88, 33
See application file for complete search history.

(56) References Cited

U.S. PATENT DOCUMENTS

| | | | |
|---|---|---|---|
| 5,987,202 A | 11/1999 | Gruenwald et al. | |
| 6,807,218 B1 | 10/2004 | Greenwood et al. | |
| 6,813,418 B1 | 11/2004 | Kragl | |
| 7,486,846 B2 * | 2/2009 | Warashina et al. | 385/14 |
| 7,547,151 B2 * | 6/2009 | Nagasaka | 385/93 |
| 2002/0085785 A1 | 7/2002 | Kishimoto et al. | |
| 2003/0086653 A1 | 5/2003 | Kuhara | |
| 2005/0069253 A1 | 3/2005 | Heideman | |
| 2005/0201694 A1 * | 9/2005 | Rosinski | 385/92 |

FOREIGN PATENT DOCUMENTS

| | | |
|---|---|---|
| DE | 35 43 558 C2 | 6/1987 |
| FR | 2 836 236 A1 | 8/2003 |
| JP | 2004-118081 A | 4/2004 |
| WO | WO-03/056374 A2 | 7/2003 |

OTHER PUBLICATIONS

European Search Report of European Patent Application No. EP 10 010 760.6; Feb. 21, 2011; 6 pages.
European Search Report of European Patent Application No. EP 11 180 862.2; Oct. 28, 2011; 7 pages.

* cited by examiner

*Primary Examiner* — Tony Ko
(74) *Attorney, Agent, or Firm* — Foley & Lardner LLP

(57) ABSTRACT

The invention relates to an optical module (10) comprising a guiding element (30) adapted to guide optical radiation (P); a converting element (50, 200) adapted to convert received electrical energy into optical radiation or to convert received optical radiation into electrical energy; a mirror (70) arranged in the beam path (40) between the optical guiding element and the converting element and configured to optically connect the guiding element and the converting element; and a carrier (20) having a first surface section (22) for carrying the mirror and a second surface (23) section for carrying the converting element. The carrier is made of polymer material.

13 Claims, 4 Drawing Sheets

OPTICAL MODULE

The invention relates to an optical module comprising a guiding element, a converting element, a mirror, and a carrier.

BACKGROUND OF THE INVENTION

German Patent DE 35 43 558 C2 discloses an optical module comprising the features of the preamble of claim 1. In this module, the light arriving in an optical fibre is coupled to a photodetector, which is expediently connected to an amplifier immediately downstream. The optical fibre and photodetector are coupled via an optical deflecting element and mounted on a carrier element, which consists of single crystal semiconductor material such as silicon.

Devices like those described in the cited German Patent require costly fabrication processes as the carrier is made of semiconductor material.

OBJECTIVE OF THE PRESENT INVENTION

An objective of the present invention is to provide an optical module which can be fabricated at lower costs than prior art devices but shows a competitive performance.

BRIEF SUMMARY OF THE INVENTION

An embodiment of the invention relates to an optical module comprising: a guiding element adapted to guide optical radiation; a converting element adapted to convert received electrical energy into optical radiation or to convert received optical radiation into electrical energy; a mirror arranged in the beam path between the optical guiding element and the converting element and configured to optically connect the guiding element and the converting element; and a carrier having a first surface section for carrying the mirror and a second surface section for carrying the converting element. According to the invention, the carrier is made of polymer material.

An advantage of the present invention is that the carrier can be fabricated at very low cost. In contrast to semiconductor material, polymer material allows defining the carrier surface by moulding, only. As such, the entire carrier including all surface sections may be fabricated in a single moulding step, e. g. by injection moulding.

According to a preferred embodiment the optical module further comprises an amplifier arranged on a third surface section of the carrier and electrically connected to the converting element.

The amplifier and/or the converting element may be thermally coupled to a heat sink layer arranged on the second surface section and/or the third surface section of the carrier. This heat sink layer may extend into the first surface section and form the mirror, which then emits thermal energy generated by the amplifier and/or the converting element over the mirror surface.

The heat sink layer may also be electrically conductive. This allows electrically connecting the heat sink layer to at least one of the amplifier and the converter. E. g., the heat sink layer may form an electrically conducting ground of the optical module.

The heat sink layer may consist of or comprise metal since metal provides both, good thermal and electrical conductivity.

Further, a heat coupling section of the heat sink layer may be arranged between the carrier surface and the amplifier in order to provide a sufficient transfer of heat from the amplifier to the mirror surface. Alternatively or additionally, a heat coupling section of the heat sink layer may be arranged between the carrier surface and the converting element in order to provide a sufficient transfer of heat from the converter to the mirror surface.

The heat sink layer may provide a heat path extending from the third surface section via the second surface section into the first surface section in order to transfer heat of the amplifier from the third surface section into the second surface section, and the heat of the converter and the heat of the amplifier from the second surface section into the first surface section.

Alternatively, the heat sink layer may provide a first heat path section extending from the second surface section into the first surface section in order to transfer heat of the converter from the second surface section into the first surface section, and a second heat path section extending from the third surface section into the first surface section in order to transfer heat of the amplifier from the third surface section into the first surface section. The first heat path section and the second heat path section may be arranged at least partly in parallel.

The carrier surface may comprise a step section separating the second and third surface section. The step section may be angled relative to the second and third section.

The heat sink layer may comprise a heat-path step section which connects the first and second heat path sections.

The outer mirror surface may be covered by a gas or a liquid.

The heat transfer away from the mirror may be based on thermal radiation and/or convection. In other words, the mirror may emit heat by generating thermal radiation.

The converting element may be a radiation emitting or radiation detecting device such as a photodiode or a laser. If the converter is a radiation detecting device, the amplifier is preferably a transimpedance amplifier.

The guiding element may be an optical fibre or an optical connector.

The mirror is preferably concave and preferably focuses the optical radiation onto the converting element and/or onto the guiding element.

Summarizing, the optical module preferably comprises one or more of the following features:

The carrier may comprise at least one alignment element for aligning the guiding element.

The first surface section may be concave.

The converting element may be a backside illuminated photodetector (e.g. photodiode) or a backside emitting laser source. The photodiode may have an inactive transparent substrate and an active region. The inactive transparent substrate may be arranged in the beam path between the mirror and the active region.

The mirror may be a concave mirror formed by a metal layer arranged on top of said concave first surface section of said carrier. Said concave mirror may focus the optical radiation from the active region onto the guiding element and/or from the guiding element onto the active region.

Furthermore, the optical module may comprise one or more of the following features:

The converting element may be a backside illuminated photodetector.

The optical module may comprise an amplifier arranged on a third surface section of the carrier and electrically connected to said backside illuminated photodetector.

The amplifier may be thermally coupled to a heat sink layer arranged on the third surface section of the carrier.

Said heat sink layer may extend into the first surface section and may form said mirror. Said mirror may emit thermal energy generated by the amplifier over the mirror surface.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are therefore not to be considered to be limiting of its scope, the invention will be described and explained with additional specificity and detail by the use of the accompanying drawings in which.

DETAILED DESCRIPTION OF THE PREFERRED EMBODIMENT

The preferred embodiment of the present invention will be best understood by reference to the drawings, wherein identical or comparable parts are designated by the same reference signs throughout.

It will be readily understood that the present invention, as generally described and illustrated in the figures herein, could vary in a wide range. Thus, the following more detailed description of the exemplary embodiments of the present invention, as represented in FIGS. 1-4, is not intended to limit the scope of the invention, as claimed, but is merely representative of presently preferred embodiments of the invention.

Figure 1:
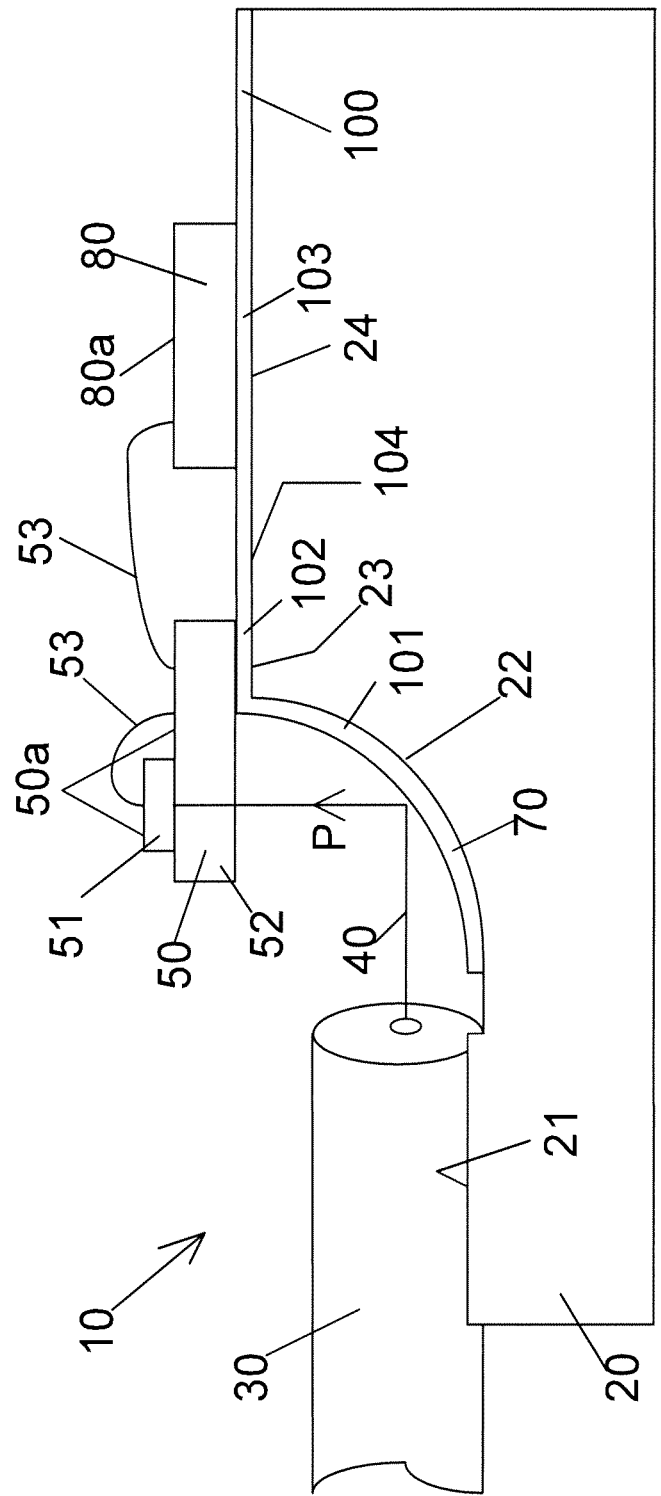
FIG. 1 shows a first exemplary embodiment of an optical module according to the present invention.

FIG. 1 shows a first exemplary embodiment of an optical module 10 according to the present invention. The optical module 10 comprises a carrier 20 which consists of polymer material. Preferably, the polymer carrier 20 is formed by an injection moulding process.

The optical module 10 further comprises a guiding element 30 adapted to guide optical radiation P. The beam path of the optical radiation P is indicated by reference numeral 40 in FIG. 1. The guiding element 30 may be formed by an optical fibre such as shown in FIG. 1. Alternatively, the guiding element 30 may be an optical connector, a ferrule or any other optically active or passive element. The guiding element 30 is carried by the polymer carrier 20 which may comprise aligning elements 21 such as grooves for aligning the guiding element 30 at a predefined position on the polymer carrier 20.

Furthermore, the optical module 10 comprises a converting element. According to the embodiment shown in FIG. 1, the converting element is a photodetector 50 which converts the received optical radiation P into electrical energy.

The photodetector 50 is preferably a backside illuminated photodiode which comprises an inactive transparent substrate 52 and an active detection region 51 positioned on a top surface of the substrate 52. As such, the inactive transparent substrate 52 is arranged in the beam path between a mirror 70 and the active detection region 51. The backside of the inactive transparent substrate 52 is oriented towards the mirror 70.

The active detection region 51 may be a monolithically integrated region being integrated inside the inactive transparent substrate 52. Alternatively, the active detection region 51 may be a separate component or part placed on top of the inactive substrate 52.

Figure 2:
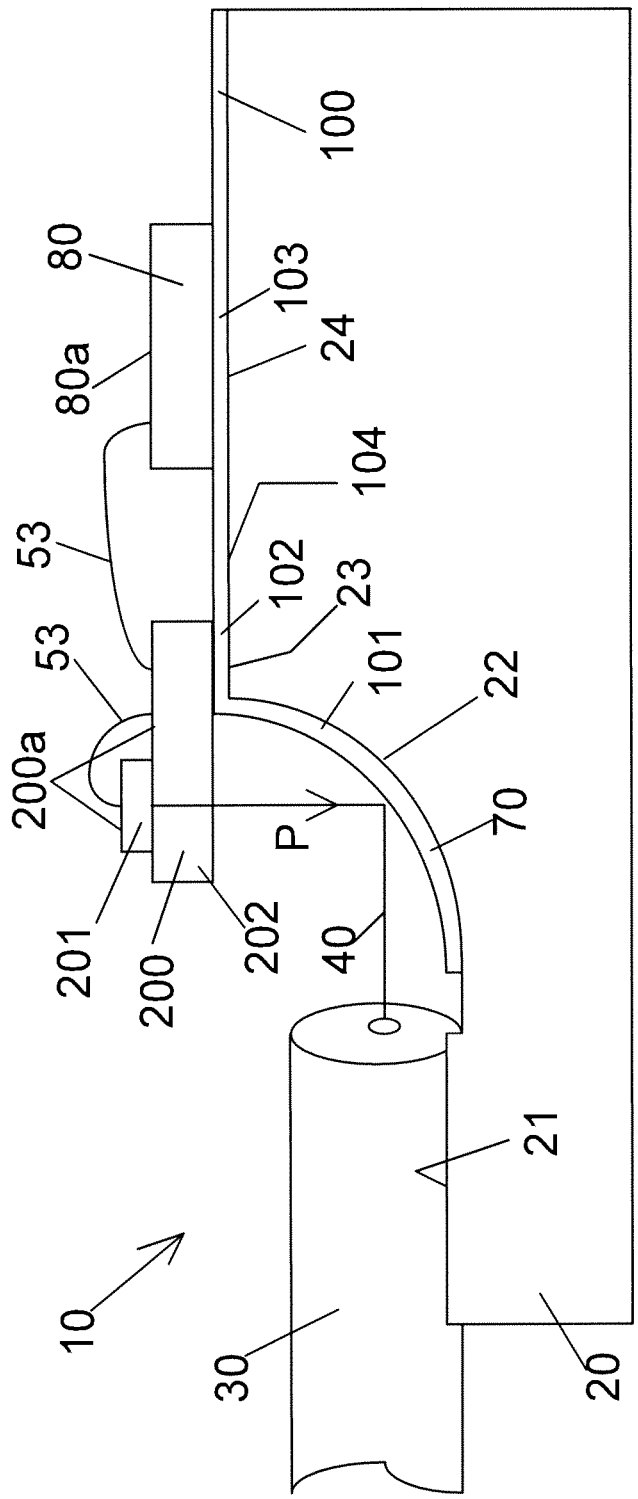
FIG. 2 shows a second exemplary embodiment of an optical module according to the present invention.

As such, the optical radiation P leaving the guiding element 30 will be detected by the photodetector 50 as indicated in FIG. 1. Alternatively, the converting element may be a light emitting element, e. g. a laser. Such an embodiment is shown in FIG. 2 and will be referred to hereinafter.

Referring again to the embodiment shown in FIG. 1, one can see that the optical module 10 further comprises said mirror 70 which is carried by a first surface section 22 of the polymer carrier 20. The first surface section 22 is concave such that the mirror 70 has also a concave outer surface. Thus, the mirror 70 forms a concave mirror which focuses the optical radiation P on the active region 51 of the photodetector 50.

The focussing mirror 70 is arranged in the beam path 40 between the optical guiding element 30 and the photodetector 50, and optically connects the guiding element 30 and the photodetector 50 as indicated by the beam path 40 shown in FIG. 1. The beam path 40 passes from the guiding element 30 towards the concave mirror 70 and from there through the inactive transparent substrate 52, and reaches the active detection region 51 due to the focussing effect of the concave mirror.

The photodetector 50 is carried by a second surface section 23 of the polymer carrier 20. A third surface section 24 carries an electrical amplifier 80 which is electrically connected with the photodetector 50.

The amplifier 80 and the photodetector 50 are thermally coupled to a heat sink layer 100 which consists of thermally conductive material (e.g. metal) and at least partially covers the second and third surface sections 23 and 24 of the polymer carrier 20.

The material of the heat sink layer 100 is preferably also electrically conductive. This allows connecting the heat sink layer 100 with electrical ground, and using the heat sink layer 100 as a ground layer for the electrical connection of the photodiode 50 and/or the amplifier 80.

The heat sink layer 100 comprises a mirror section 101, first and second heat coupling sections 102 and 103, and a heat path section 104.

The first heat coupling section 102 of the heat sink layer 100 is arranged between the second surface section 23 of the polymer carrier 20 and the photodetector 50. As such, the first heat coupling section 102 thermally couples the photodetector 50 to the heat sink layer 100.

The second heat coupling section 103 of the heat sink layer 100 is arranged between the third surface section 24 of the polymer carrier 20 and the amplifier 80. As such, the second heat coupling section 103 thermally couples the amplifier 80 to the heat sink layer 100.

The mirror section 101 extends into the first surface section 22 of the polymer carrier 20 and forms the mirror 70 which optically connects the guiding element 30 and the photodetector 50. The mirror section 101 of the heat sink layer 100 further emits thermal energy including those generated by the amplifier 80 and the photodetector 50 over the mirror surface.

Summarizing, the mirror section 101 of the heat sink layer 100 (i.e. the mirror 70) has two functionalities, namely to optically connect the photodetector 50 and the guiding element 30 by reflecting and focussing the optical beam, and to emit thermal energy generated by the amplifier 80 and the photodetector 50. The thermal emission may be based on convection and/or on thermal radiation.

In order to thermally connect the first heat coupling section 102 and the second heat coupling section 103 with the mirror section 101, the heat sink layer 100 further comprises the heat path section 104 which extends from the second heat coupling section 103 via the first heat coupling section 102 into the mirror section 101 of the heat sink layer 100. This heat path section 104 transfers the heat of the amplifier 80 and the heat of the photodetector 50 into the mirror section 101.

Bond wires 53 for the electrical signal path between the active region 51 of the photodetector 50 and the amplifier 80 are preferably arranged between the top surface 50a of the photodetector 50 and the top surface 80a of the amplifier 80, i.e. separate from the polymer carrier 20 and the heat sink and/or electrical ground layers 100.

FIG. 2 shows a second exemplary embodiment of an optical module 10 according to the present invention. The optical module 10 comprises a light emitting element 200 as converting element instead of a photodetector. The light emitting element 200 may be a backside emitting laser diode having an inactive transparent substrate 202 and an active laser region 201. The laser beam exits the active laser region 201, passes the inactive transparent substrate 202, and reaches the concave mirror 70 which focuses the laser radiation onto the guiding element 30.

This light emitting element 200 converts electrical energy into optical radiation P. As such, the optical beam path 40 is opposite to the optical beam path shown in FIG. 1. The other components of the optical module 10 may correspond to those of the embodiment shown in FIG. 1 and are thus indicated by the same reference numerals.

Bond wires 53 for the electrical signal path between the active region 201 of laser diode 200 and the amplifier 80 are preferably arranged between the top surface 200a of the laser 200 and the top surface 80a of the amplifier 80, i.e. separate from the polymer carrier 20 and the heat sink and/or electrical ground layer(s) 100.

Figure 3:
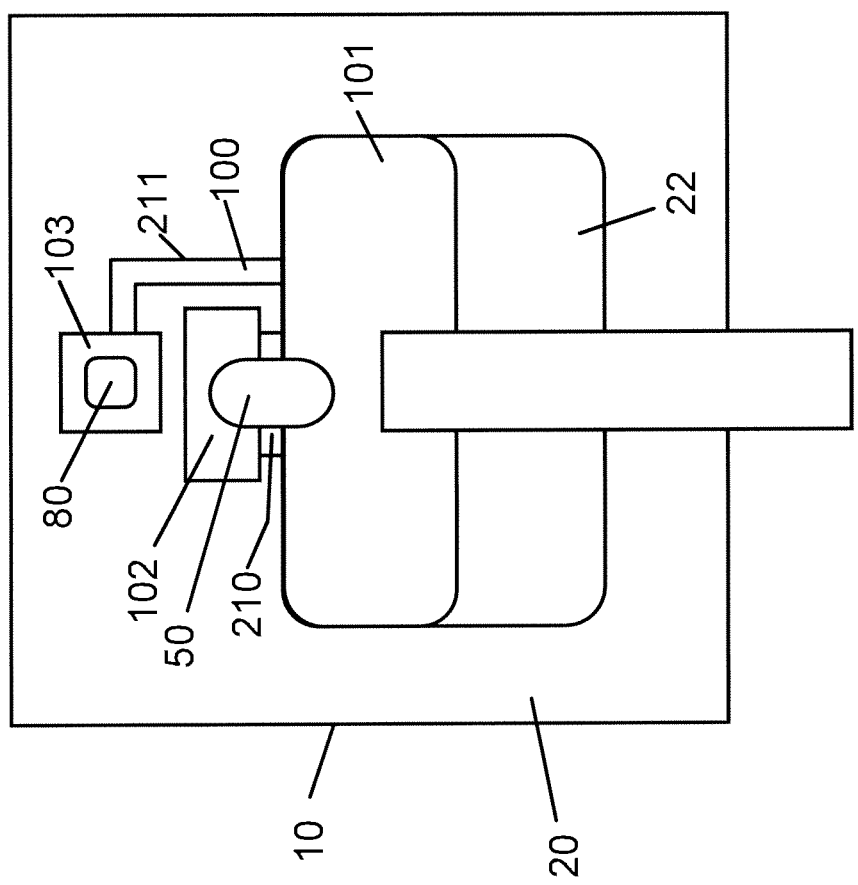
FIG. 3 shows a third exemplary embodiment of an optical module according to the present invention.

FIG. 3 shows a third exemplary embodiment of an optical module 10 according to the present invention as viewed from above. In contrast to the embodiments shown in FIGS. 1 and 2, the heat sink layer 100 comprises two heat path sections 210 and 211.

The first heat path section 210 provides a first heat path extending from the first heat coupling section 102 arranged in the second surface section of the polymer carrier 20, into the mirror section 101 arranged in the first surface section 22 of the polymer carrier 20. The first heat path transfers the heat of the photodetector 50 from the first heat coupling section 102 directly to the mirror section 101 for thermal emission and cooling.

The second heat path section 211 provides a second heat path extending from the second heat coupling section 103 arranged in the third surface section of the polymer carrier 20, into the mirror section 101 arranged in the first surface section 22 of the polymer carrier 20. The second heat path transfers the heat of the amplifier 80 from the second heat coupling section 103 directly to the mirror section 101 for thermal emission and cooling.

The first heat path and the second heat path are thermally arranged in parallel.

Figure 4:
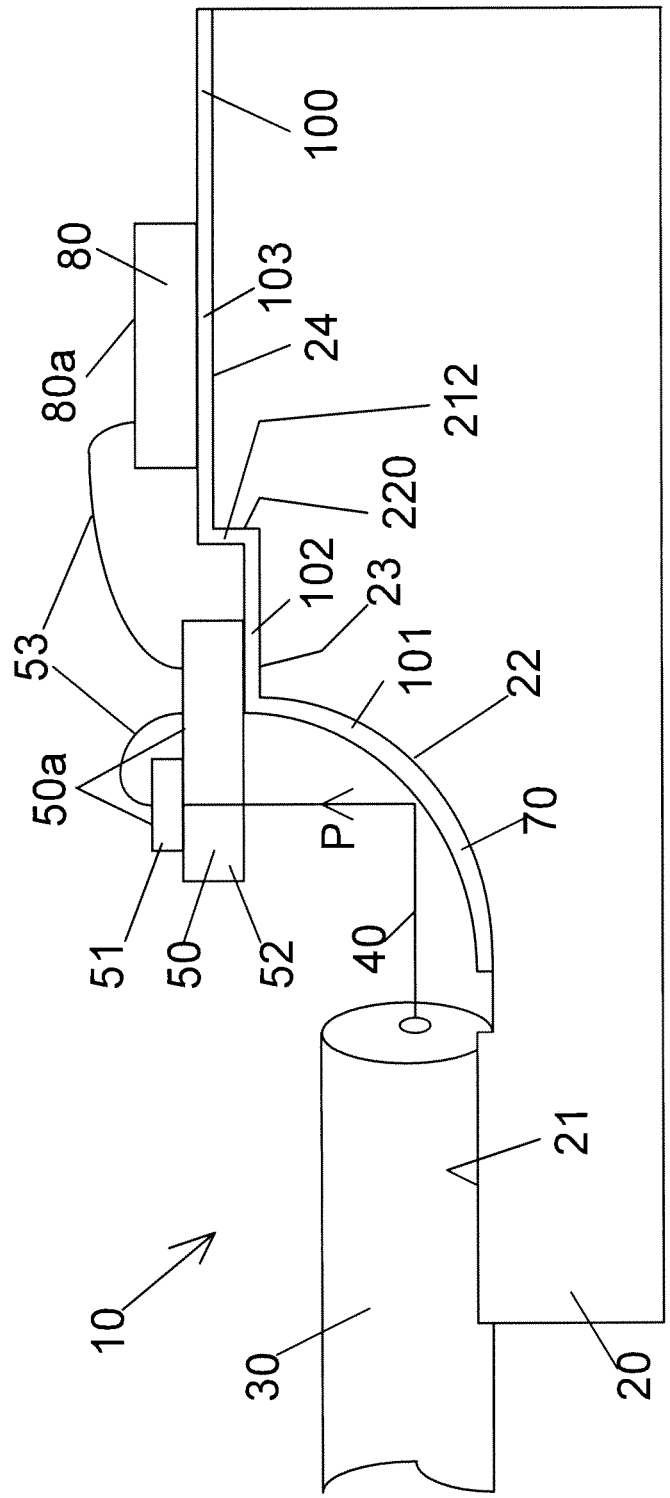
FIG. 4 shows a fourth exemplary embodiment of an optical module according to the present invention.

FIG. 4 shows a fourth exemplary embodiment of an optical module 10 according to the present invention. In contrast to the embodiments shown in FIGS. 1-3, the polymer carrier 20 comprises a step section 220 which separates the second surface section 23 and the third surface section 24. The step section 220 may be angled relative to the second and third surface sections.

The heat sink layer 100 comprises a heat-path step section 212 which thermally and electrically connects the first heat coupling section 102 and the second heat coupling section 103.

In the embodiments shown in FIGS. 1-4, the carrier 20 is preferably fabricated in a single moulding step, e. g. by injection moulding. In this moulding step, the entire outer surface including all surface sections is preferably defined.

Furthermore, the heat sink layer 100 including all of its sections is preferably made during the same fabrication step, e.g. by depositing a metal layer during a single deposition process. The heat sink layer 100 is preferably used as an electrical layer, e.g. ground layer, of the optical module 10.

REFERENCE NUMERALS 10 optical module
20 polymer carrier
21 aligning elements
22 first surface section
23 second surface section
24 third surface section
30 guiding element
40 beam path
50 photodetector
50a top surface
51 active region
52 inactive transparent substrate
53 bond wire
P optical radiation
70 mirror
80 amplifier
80a top surface
100 heat sink layer
101 mirror section
102 first heat coupling section
103 second heat coupling section
104 heat path section
200 light emitting element
200a top surface
201 active laser region
202 inactive transparent substrate
210 first heat path section
211 second heat path section
212 heat-path step section
220 step section

The invention claimed is:

1. An optical module comprising:
a guiding element adapted to guide optical radiation;
a converting element adapted to convert received electrical energy into optical radiation or to convert received optical radiation into electrical energy;
a mirror arranged in the beam path between the optical guiding element and the converting element and configured to optically connect the guiding element and the converting element; and
a carrier having a first surface section for carrying the mirror and a second surface section for carrying the converting element;
wherein the carrier is made of polymer material;
wherein the optical module further comprises an amplifier arranged on a third surface section of the carrier and electrically connected to said converting element;

wherein the amplifier and/or the converting element is thermally coupled to a heat sink layer arranged on the second surface section and/or third surface section of the carrier;

wherein said heat sink layer extends into the first surface section and forms said mirror, said mirror emitting thermal energy generated by the amplifier and/or the converting element over the mirror surface.

2. Optical module according to claim 1 wherein a heat coupling section (103) of the heat sink layer is arranged between the carrier surface and the amplifier.

3. Optical module according to claim 1 wherein a heat coupling section (102) of the heat sink layer is arranged between the carrier surface and the converting element.

4. Optical module according to claim 1 wherein the heat sink layer is electrically conductive and connected to at least one of the amplifier and the converter.

5. Optical module according to claim 1 wherein the heat sink layer is an electrically conducting ground layer of the optical module.

6. Optical module according to claim 1 wherein the heat sink layer is a metal layer.

7. Optical module according to claim 1
wherein said heat sink layer provides a heat path extending from the third surface section (24) via the second surface (23) section into the first surface section (22), said heat path being configured to transfer the heat of the amplifier from the third surface section into the second surface section and the heat of the converter and the heat of the amplifier from the second surface section into the first surface section.

8. Optical module according to claim 1
wherein said heat sink layer comprises a first heat path section (102) extending from the second surface section (23) into the first surface section (22), said first heat path section being configured to transfer the heat of the converter (80, 200) from the second surface section into the first surface section; and
wherein said heat sink layer comprises a second heat path section (103) extending from the third surface section (24) into the first surface section (22), said second heat path section being configured to transfer the heat of the amplifier (80) from the third surface section into the first surface section.

9. Optical module according to claim 1
wherein the carrier surface comprises a step section (220) separating the second and third surface section, said step section being angled relative to the second and third section, and
wherein the heat sink layer comprises a heat-path step section (212) connecting the first and second heat path sections (102, 103).

10. Optical module according to claim 1 further comprising a gas or liquid wherein the mirror emits thermal energy by convection.

11. An optical module comprising:
a guiding element adapted to guide optical radiation;
a converting element adapted to convert received electrical energy into optical radiation or to convert received optical radiation into electrical energy;
a mirror arranged in the beam path between the optical guiding element and the converting element and configured to optically connect the guiding element and the converting element; and
a carrier having a first surface section for carrying the mirror and a second surface section for carrying the converting element;
wherein the carrier is made of polymer material;
wherein the optical module further comprises an amplifier arranged on a third surface section of the carrier and electrically connected to said converting element; and
wherein the first, second and third surface sections are fabricated by a single moulding step.

12. An optical module comprising:
a guiding element adapted to guide optical radiation;
a converting element adapted to convert received electrical energy into optical radiation or to convert received optical radiation into electrical energy;
a mirror arranged in the beam path between the optical guiding element and the converting element and configured to optically connect the guiding element and the converting element; and
a carrier having a first surface section for carrying the mirror and a second surface section for carrying the converting element;
wherein the carrier is made of polymer material;
wherein said carrier comprises at least one alignment element for aligning the guiding element,
wherein the first surface section is concave,
wherein the converting element is a backside illuminated photodiode or a backside emitting laser diode, said photodiode or laser diode having an inactive transparent substrate and an active region, said inactive transparent substrate being arranged in the beam path between the mirror and the active region, and
wherein the mirror is a concave mirror formed by a metal layer arranged on top of said concave first surface section of said carrier, said concave mirror focussing the optical radiation from the active region onto the guiding element and/or from the guiding element onto the active region.

13. Optical module according to claim 12,
wherein said converting element (50) is a backside illuminated photodiode detector,
wherein the optical module further comprises an amplifier (80) arranged on a third surface section (24) of the carrier and electrically connected to said backside illuminated photodiode detector,
wherein the amplifier is thermally coupled to a heat sink layer (100) arranged on the third surface section of the carrier; and
wherein said heat sink layer extends into the first surface section (22) and forms said mirror (70), said mirror emitting thermal energy generated by the amplifier over the mirror surface.

* * * * *